United States Patent
Olah et al.

(10) Patent No.: US 6,446,119 B1
(45) Date of Patent: *Sep. 3, 2002

(54) SYSTEM AND METHOD FOR MONITORING COMPUTER USAGE

(75) Inventors: Laslo Olah, 3124 Grapevine La., Plano, TX (US) 75074; Ferenc Friedler, Manhattan, KS (US); Zoltan Kovacs, Borbas U (HU)

(73) Assignee: Laslo Olah, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/959,932

(22) Filed: Oct. 29, 1997

Related U.S. Application Data (60) Provisional application No. 60/055,523, filed on Aug. 7, 1997.

(51) Int. Cl.[7] ............................................. G06F 15/173
(52) U.S. Cl. ........................ 709/224; 709/223; 709/225
(58) Field of Search ............................... 709/223, 225, 709/224; 707/9, 10, 102; 705/10; 714/37; 713/201, 202

(56) References Cited

U.S. PATENT DOCUMENTS

| | | | | |
|---|---|---|---|---|
| 5,349,675 A | * | 9/1994 | Fitzgerald et al. | 709/217 |
| 5,379,409 A | * | 1/1995 | Ishikawa | 714/37 |
| 5,388,252 A | * | 2/1995 | Dreste et al. | 709/330 |
| 5,586,240 A | * | 12/1996 | Khan et al. | 707/508 |
| 5,732,212 A | * | 3/1998 | Perholtz et al. | 709/224 |
| 5,761,662 A | * | 6/1998 | Dasan | 707/10 |
| 5,832,212 A | * | 11/1998 | Cragun et al. | 714/37 |
| 5,835,722 A | * | 11/1998 | Bradshaw et al. | 709/215 |
| 5,848,396 A | * | 12/1998 | Gerace | 705/10 |
| 5,848,412 A | * | 12/1998 | Rowland et al. | 707/9 |
| 5,848,418 A | * | 12/1998 | De Souza et al. | 707/102 |
| 5,898,419 A | * | 4/1999 | Liu | 345/127 |
| 5,949,415 A | * | 9/1999 | Lin et al. | 345/335 |
| 5,987,506 A | * | 11/1999 | Carter et al. | 709/213 |
| 5,987,611 A | * | 11/1999 | Freund | 713/201 |
| 6,023,507 A | * | 2/2000 | Wookey | 714/805 |

* cited by examiner

*Primary Examiner*—Ayaz Sheikh
*Assistant Examiner*—Philip B. Tran
(74) *Attorney, Agent, or Firm*—Jenkens & Gilchrist A Professional Corporation (57) ABSTRACT

A system and method for monitoring computer usage is disclosed. A computer operator specifies discrete moments of a computer's usage at which screen captures are executed and saved to a log. The operator, such as a parent or employer, can later retrieve the screen images to provide a graphical record of the activities, such as that of their child or employees, on that computer. The system and method of the present invention gives full authority of determining what type of computer usage is inappropriate or offensive to the computer operator. Through the use of the present invention, an operator may determine not only whether or not a user's computer activity was inappropriate, but may also simply determine if the computer was operated in any manner. By employing the system and method of the disclosed invention, a record of a user's activity or inactivity is created that, in addition to being highly simple to evaluate, is an irrefutable account of the user's computer usage. Variations of the system and method allow the operator to direct monitoring events toward online or off-line activities.

38 Claims, 4 Drawing Sheets

SHOW ALL OF
THE SAVED SCREENS

☐

[Click here then "ENTER"]

SHOW SAVED SCREENS
BETWEEN

FROM:
DATE ☐ ☐ ☐
     M M M

TIME ☐   ○ am
     H   ○ pm

TO:
DATE ☐ ☐ ☐
     M M M

TIME ☐   ○ am
     H   ○ pm

Note: For time set, Numbers are between 01-12
Complete, then "ENTER"

| DELETE ENTIRE PROGRAM | ENTER NEW PERSONAL CODE | EXIT PROGRAM | UNDO | RETURN TO MAIN MENU | DELETE SAVED DATA | SHOW SAVED DATA | ENTER |

FIG. 5

AT EACH NEW DOEN-LOAD, THIS FUNCTION WILL SAVE THE FIRST
SECOND OF THOSE MINUTES OF EACH HOUR THAT YOU SELECTED

PLEASE ENTER THE MINUTES OF EACH NEW DOWN-LOAD WHICH
YOU WISH TO SAVE

[after completion: "ENTER"]

| 90 | 91 | 92 | 93 | 94 |
| ☐ | ☐ | ☐ | ☐ | ☐ |
| FIRST SAVE | SECOND SAVE | THIRD SAVE | FOURTH SAVE | FIFTH SAVE |

NOTE: NUMBERS MUST BE BETWEEN 01-60

YOU ARE IN "TOTAL/MANUAL SET UP" MODE

| DELETE ENTIRE PROGRAM | ENTER NEW PERSONAL CODE | EXIT PROGRAM | UNDO | RETURN TO MAIN MENU | DELETE SAVED DATA | SHOW SAVED DATA | ENTER |

FIG. 6

SYSTEM AND METHOD FOR MONITORING COMPUTER USAGE

This nonprovisional application claims priority based upon the following prior U.S. Provisional Patent Application Serial No. 60/055,523, filed Aug. 7, 1997.

BACKGROUND OF THE INVENTION

Technical Field of the Invention

The present invention relates to the monitoring of computer usage and, in particular, to a system and method for monitoring or recording a user's activity on a computer system by capturing the content on a display screen.

Background and Objects of the Present Invention

Since the introduction of the personal computer in the early 1980's, the PC has been subject to constant change, ever increasing in capability and usage. From its earliest form in which the data accessible was limited to that which the user could load from a floppy disk to the typical gigabyte hard drives common on PCS today, the amount of data and the ease of obtaining this data have been growing rapidly. With the fruition of the computer network, the available data is no longer limited to the user's system or what the user can load on his system. Local Area Networks or LANs are now common in small businesses, and in such networks users may, in addition to their own local data, obtain data from other local stations as well as data that is available on the local server. Corporate networks and internetworks may connect multiple LANs, thereby increasing the data available to users. Larger still are Wide Area Networks (WANs) and Metropolitan Area Networks (MANs), the latter of which is designed to cover large cities.

The largest such network, commonly known as the Internet, has introduced vast amounts of information into the business place and the home. The individual networks that make up the Internet include networks which may be served from sources such as commercial servers (.com), university servers (.edu), research networks (.org, net), and military networks (.mil). These networks are located throughout the world and-their numbers are ever increasing with an estimated 85,000 new domain registrations presently occurring each month with countless Internet sites spawned from these domains.

With the exponential growth of the Internet and the explosion of interest worldwide, one natural consequence of this profundity is a growing diversity in the subject matter of the available information. Although-this was the original intent of the Internet developers, there are obvious disadvantages and undesirable consequences of such a global information exchange. What is quickly becoming a notorious example of such occurrence is the proliferation of pornography, hate materials, and other materials, some of which may not only be offensive, but illegal.

A specific difficulty encountered with the introduction of this powerful informational tool in the business and home is the logistical problem of governing the usage of the available data to specific users. In a corporate environment with access to, for example, the Internet, it is obviously advantageous for management to be able to limit or monitor in some fashion their employees' usage of such a resource not only to ensure productivity but to prevent liability for inappropriate employee Internet activities. Likewise, in the home, a parent may desire to have the beneficial educational information that exists in great quantity on the Internet available for his child, but, at the same time, may wish to prevent that child from accessing inappropriate materials, either by intent or accident.

In the discussion that follows, 'operator' will refer to the person attempting to monitor or block another person's activity on a computer system by any method or means. 'User' will refer to the person whose computer activity is subject to being monitored or blocked.

Currently, those companies with the financial resources desiring the efficiency of exchanging information through the Internet may elect to use an intranet, e.g., a LAN. This way, the company can distribute information to its employees with the conveniences of the Internet, but without actually being connected to the Internet. The company may also either block specific domains from access by its employees, or give access to only specified domains. This may be achieved by appropriate software or coding to block domains at a gateway or firewall. However, these methods may not be financially or technically feasible, or this may not serve the company's intent in any regard. Also, this technique does not prevent employees from loading computer games on their computer and playing them during work hours. Often, a company may desire that its employees have unlimited access to data resources through the Internet with the only restriction being that their access is useful for fulfilling the duties of their jobs. In this instance, it would be counterproductive to give access to only certain domains, as doing so would block access to future domains that may provide information beneficial to serving well an employee's position.

Commercially available applications to help combat this problem on the home or business PC are well known, such as Net Nanny™, Surf Watch™, and NetSnitch™. These applications and their respective limitations are now discussed.

Net Nanny™ is a software utility marketed to control, primarily, children's access to offensive Internet sites. This software's primary functionality is the use of an operator-defined, customized dictionary of terms or phrases to be blocked from access. In operation, Net Nanny™ performs a system shutdown whenever any material matching criteria in the operator-defined dictionary is accessed. This product works offline as well as online and performs a system shutdown when material matching specified criteria are accessed, where the material to be blocked could be loaded from floppy disks, CD-ROMS, local hard drives, network drives, or any other appropriate media. It can also be configured to provide the user a warning or to create a log of "offenses"—accesses to material that have been defined as offensive in the customized dictionary. Specific sites are also able to be blocked by the software operator, and similarly, the operator may make only certain sites available to be accessed.

Although this specific, operator-defined approach is somewhat useful, a number of limitations are apparent. For example, in utilizing a customized dictionary to block sites by keyword, the operator is responsible for formulating a list of words or phrases that could be included on a site with offensive material. Any descriptive phrases or terminology overlooked or unknown by the operator may therefore be readily available to the user. In addition, material deemed offensive to the operator is not necessarily described on a website by offensive descriptive words that would be detected by the blocking software. For example, pornographic material may be served from a server in a numeric index format. In this case, graphic files may be sequentially numbered with no descriptive text on that site. In this instance, it would not be possible for the blocking software to detect the presence of the offensive graphic material. The same case would be true when operating the blocking software offline. Unless a graphic file, for instance, was named with a title that matched an offensive criteria, the file could be viewed without generating a detection by the blocking software.

SurfWatch™ is another program designed to block children's or employees' access to offensive Internet sites. It is intended to solely block offensive Internet sites and is therefore utilized only for online activities. Primarily, it relies on blocking sites by use of a database that contains sites that have been determined to be offensive and by the use of keyword filters. The database is periodically updated and is available through a service with payment of a licensing fee. Through the licensing agency, criteria have been established as to what material is deemed offensive, which includes, but is not limited to, sexually explicit, violent, and/or illegal drug information. The software operator has configuration options available to alter the criteria by which Internet sites are blocked.

Again, the limitations are obvious. By relying on a licensing agent to develop updated databases of offensive sites, the operator is reliant on the agent to determine or locate any and all such sites containing material that is offensive. At best, the agent would be able to eliminate a large majority of such sites. It would not be reasonable, however, to expect such an agency to be able to locate every possible such site.

Additionally, there would exist a necessary delay in the creation of a new site containing offensive material and the time at which it is detected by the licensing agency and updated in the database of blocked sites. During that time, any user utilizing a system with the blocking software implemented by an operator would have unrestricted access to that site, assuming that the site did not contain descriptors matching those in the filtering module of the software.

A further problem of such a blocking method is that the operator is relying on a third party, the licensing agency, to concur with the operator in the subjective determination of what material is offensive. This method, in its most fundamental aspect, removes from the operator the ability to censor objectionable material as deemed objectionable by the operator. This limits the control of the operator to the task of formulating descriptive terms and phrases to be used by the filtering module, a method similar to and with limitations consistent with the previously discussed prior art application.

Another commercially available application is NetSnitch™ which does not actively block Internet sites, as the previously discussed art does, but instead creates a log of Uniform Resource Locators (URLs) that can later be reviewed and loaded by the software operator to determine what type of Internet sites have been visited by the user. It is designed to function online and, therefore, its usefulness is limited to online activities. When the user goes online, a log is activated which lists the specific Internet sites the user visits by recording that site's URL. It is, therefore, used as a monitor of user activity by allowing the software operator to later retrieve the log, and if desired, to go online and load the URLs one at a time to investigate what type of content is contained at the sites accessed by the user. As is apparent, this method does not offer any type of site blocking but gives, in one form, a complete history of the user's activity online, which is recorded by each site's URL.

An obvious limitation of this method, however, is that it only works online. Offensive material may be loaded by floppy disk, for example, and viewed without the monitoring software ever being activated. Furthermore, for the operator to determine the user's online activity history, it is necessary for the operator to go online him or herself, and load each URL to investigate the material at each site, a time consuming and inconvenient task. Also, none of the above techniques is able to verify the user's actual activities, e.g., the content of a user's discussion in an on-line "chat-box," which can be pornographic, racial or hate related.

It is, therefore, evident that the need exists for a convenient system and method for monitoring a computer user's activity by an operator, while not limiting the user's computing or informational allowances. Although a great deal of today's PC users' data is generated from Internet usage, it has been established that a need exists for a software application to be effective offline, as well as online. It is further desired that no limitations be placed on what type of material is to be monitored and for the application to take no action against the user and, additionally, for the application to give no suggestion to the user of the application's operation. In doing so, the operator would have sole discretion as to what type of usage is objectionable or offensive and as to what course of action should be taken.

SUMMARY OF THE INVENTION

The present invention is directed to a system and method for monitoring computer usage. In a preferred embodiment, a computer operator specifies discrete moments of a computer's usage at which screen captures are executed and saved to a log. The operator, such as a parent, can later retrieve the screen images to provide a graphical record of the activities, such as that of his child, on that computer. The system and method of the present invention overcomes the limitations and inefficiencies of the prior art and gives full authority of determining what type of computer usage is inappropriate or offensive to the computer operator. Through the use of the present invention, an operator may determine not only whether or not a user's computer activity was inappropriate, but may also simply determine if the computer was operated in any manner. By employing the system and method of the disclosed invention, a record of a user's activity or inactivity is created that, in addition to being highly simple to evaluate, is an irrefutable account of the user's computer usage. Variations of the system and method allow the operator to direct monitoring events toward online activities.

BRIEF DESCRIPTION OF THE DRAWINGS

A more complete understanding of the system and method of the present invention may be had by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
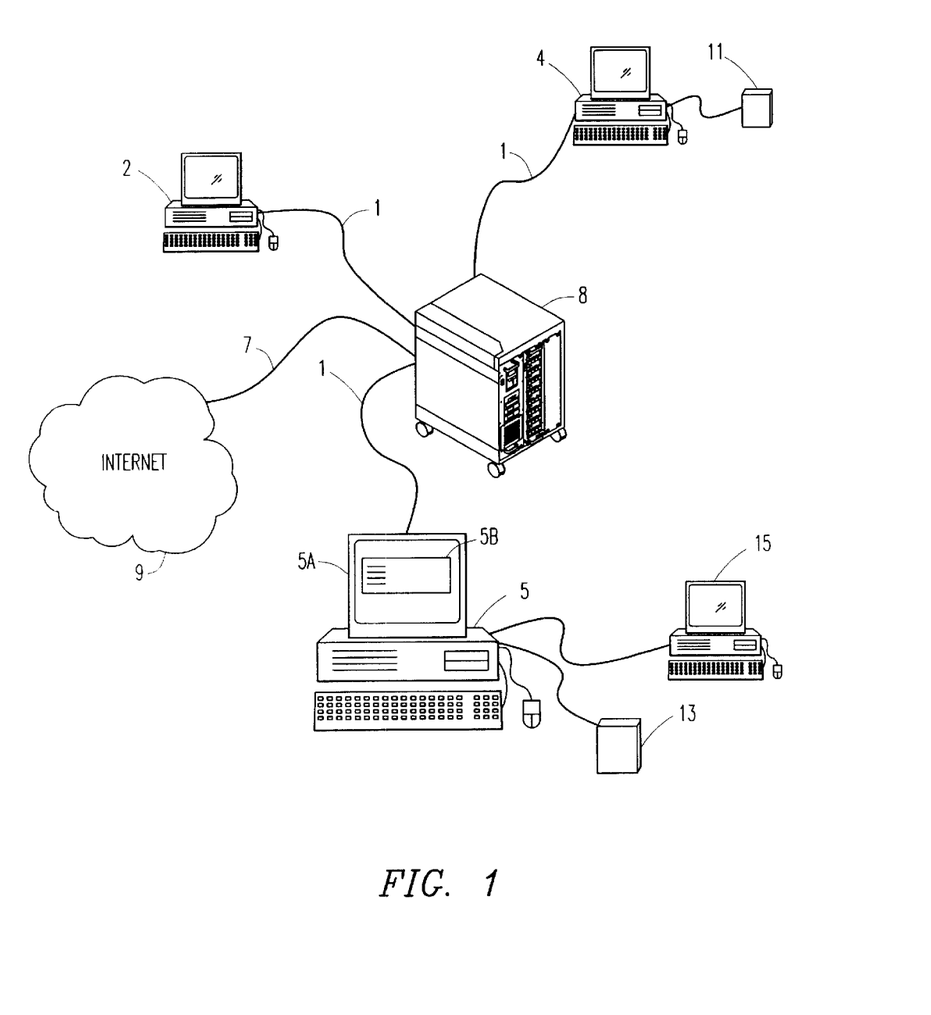
FIG. 1 is an exemplary embodiment of a conventional computer system which may employ the subject matter of the present invention.

FIG. 1 illustrates a computer system incorporating the monitoring program according to the present invention. A file server 8 connects remote computers 2, 4 and 5 through the use of a network connection, generally represented by the reference numeral 1. File server 8 further connects computers 2, 4, and 5 to the Internet 9 via a gateway 7. Remote computers 4 and 5 are, in addition to their own local hard drives, equipped with external storage devices 11 and 13, respectively. Computer 5 is further networked to include computer 15 operating remotely from it. Of course, the number and arrangement of the computers in the network depicted in FIG. 1 have been arbitrarily selected and in no way limit the merits of the present invention.

It should be understood that since the exact configuration of the computer system components may vary greatly, the present invention, as set forth in the proceeding discussion, would be effective in any number of network configurations. Furthermore, the present invention is not limited to the various expansions or rearrangements on the network as described in FIG. 1, but also applies to a stand alone system, which may be defined as a computer system with no available resources outside its own physical devices. In addition, in the continuing discussion, reference will be made to operation of the invention in a network environment.

As an example of the potential usage of the disclosed invention, the particular network configuration of FIG. 1 is first considered in an office environment. In this example, an employer has employees operating from local computers 2, 4, 5, and 15. Employees are served files and Internet access through the server 8. In doing so, the employer wishes to discretely monitor the employees usage of their local computers. Utilizing the disclosed invention, the employer may go about this in a number of ways. The subject matter of the invention, which is preferably embodied in software, is loaded and configured on each of the employees' computers, 2, 4, 5, and 15. After some time of employee computer activity, the employer could return to each of these machines, and through functions later discussed, retrieve a visual log of the users' activities.

The employer may also choose to run the invention from server 8 with specific configuration made for each employee computer, 2, 4, 5, and 15. The employer may only wish to monitor one employee, 15 for instance. The employer may feel that the employee on computer 15 is especially savvy and may feel it is a possibility that this employee would discover the operation of the disclosed invention on the local computer. With the network configuration shown, the employer could run a monitoring routine from computer 5 or the server 8, with computer 15 being the target for monitoring user activity.

It should be understood that regardless of whichever computer usage is subject to being monitored in such a network environment, the disclosed invention may be run from the targeted computer, from a network server, or from any other computer sharing appropriate communication paths with the targeted computer. Furthermore, the retrieval and viewing of monitored computer usage is not limited to the targeted computer or the computer from which the monitoring function was implemented from, but instead, it could be viewed from yet another computer with appropriate communication paths between itself and the disclosed invention.

Figure 2:
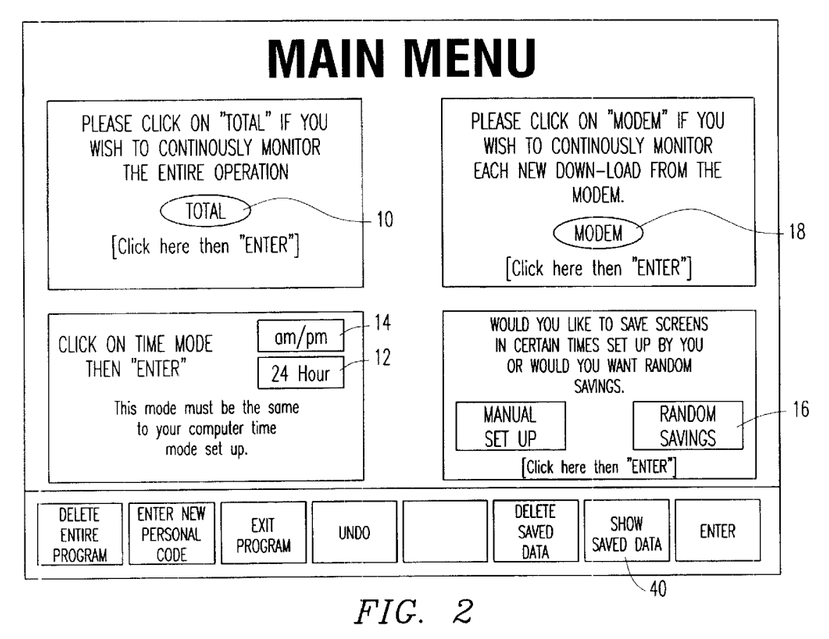
FIG. 2 is an example of a main program interface utilized by the-system and method of the present invention, particularly using the computer system of FIG. 1.
Figure 3:
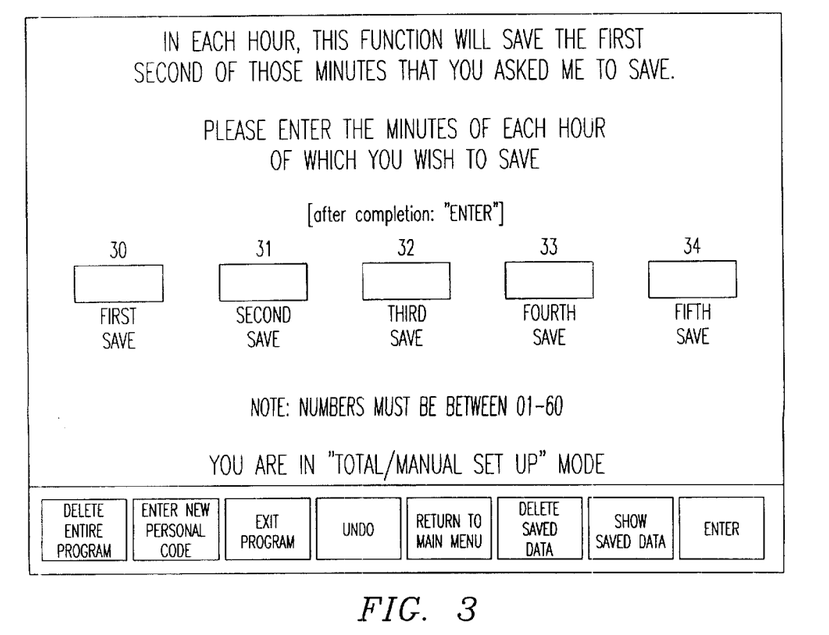
FIG. 3 illustrates a configuration interface activated when the operator chooses to continuously monitor a computer's usage with manual entry of screen capture times.
Figure 4:
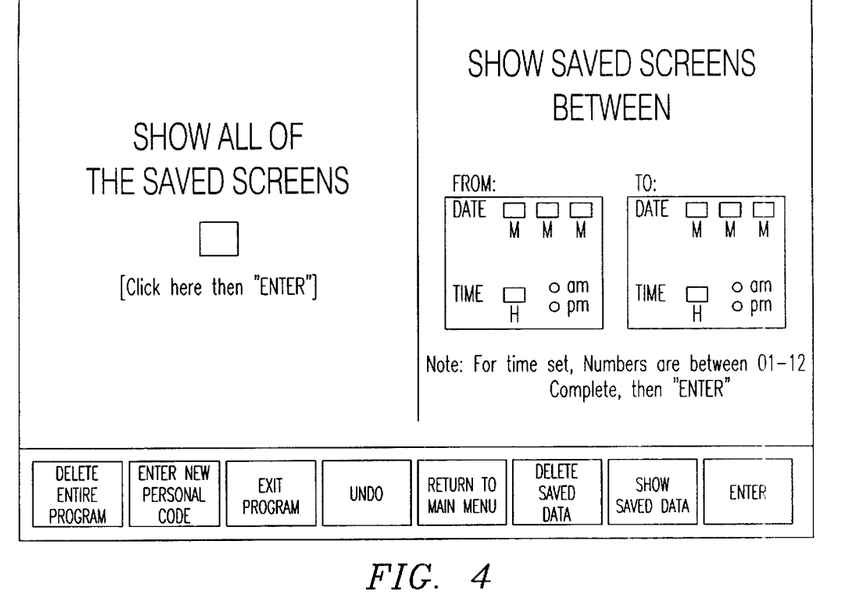
FIG. 4 is an interface activated when the operator chooses to view captured images.

The preferred embodiment of the present invention and its advantages are best understood by referring to FIGS. 2–4 of the drawings. FIG. 2 shows a main menu interface of the present invention. A number of configuration options are available to the operator. To implement the invention, the operator would select icon 10, 'Total, ' and 20, 'Manual Setup' from these options. The 'Total' option, 10, specifies that the monitoring routine of the present invention will continuously monitor the computer usage, regardless of its operating condition. The 'Manual Setup' option, 20, specifies that the operator will determine at what discrete moments the monitoring routine will execute screen captures and save these screen captures in an activity log. After selecting options 10 and 20, the operator must specify when the screen captures are to occur. This is done through an interface such as shown in FIG. 3.

The screen capture interface prompts the operator for the discrete moments at which the screen captures are to be executed, and is activated from the interface of FIG. 2 when the operator has selected either of options 10 and 20. In the example interface depicted in FIG. 3, the operator is prompted for five distinct hourly moments at which the screen capture is to be executed.

The actual time of the executions are specified relative to each hour of the day and are governed by the system clock. The operator would then enter respective values in the areas 30, 31, 32, 33, and 34. Entries are numerical values greater than or equal to 1 and less than or equal to 60, i.e., 1–60 minutes. For example, if the operator entered '03' in the area 30, a screen capture would be executed and recorded at the first second of the third minute of each hour that the computer was running. This screen capture would be in addition to those entered in 31, 32, 33, and 34. Again, all times are consistent with the system clock from which the present invention is operating. Although in the present example, five screen captures per hour are specified by the operator to be executed, it is nonetheless apparent that the number of screen captures performed is arbitrary and may vary pursuant to operator criteria or preferences.

Once the operator has configured the program to the desired specifications, a confirmation message is generated informing the operator that the software is configured and ready to monitor a user's activity. No further action is then required by the operator until viewing the results. The system may be shut down or allowed to continue running. Either way, the program monitors a user's activity once the specified criteria in the program's configuration settings are satisfied.

The operator may later retrieve the saved screen captures. The operator would begin the retrieval from the main menu, as shown in FIG. 2. Here, the operator has the option of viewing the activity log in 24 hour mode, 12, or am/pm mode, 14. After selecting the mode, the operator selects option 40, 'Show Saved Data.' For security purposes, e.g., to prevent a child or employee from accessing or modifying the log, this option preferably activates a password screen. It should be understood, however, that password verification may be implemented during other parts of the monitoring routine, particularly in accessing the initial screen shown in FIG. 2. Ideally, the operator would be the only person with knowledge of the password. Once the operator has successfully entered the correct password, the monitoring routine prompts the operator to choose between viewing saved screens or saved statistics.

Figure 6:
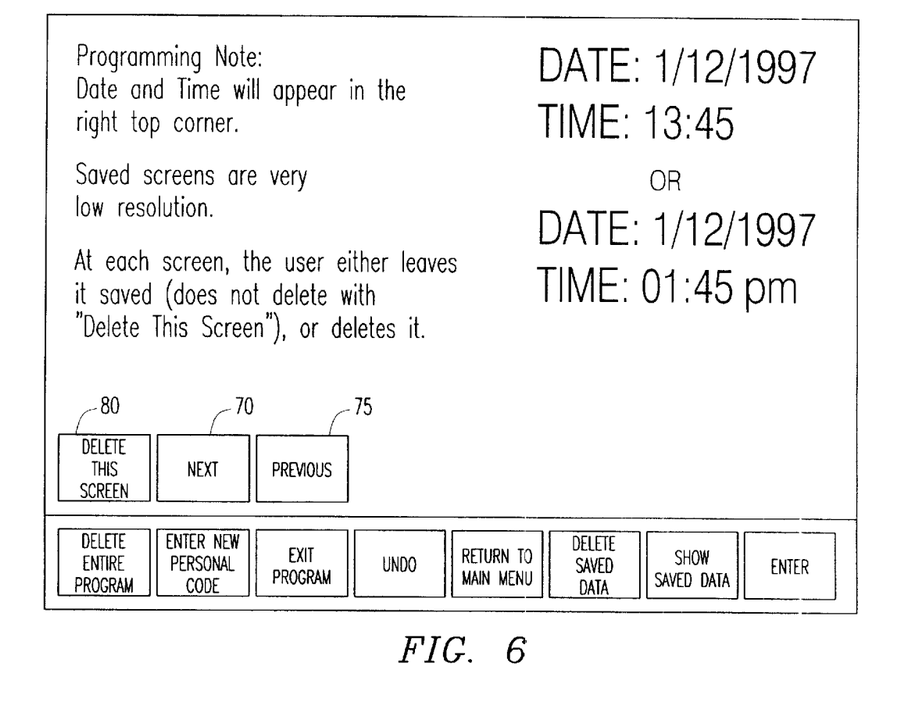
FIG. 6 illustrates a sample interface for selecting display formats.

Assuming the operator chooses to view the saved screens, an interface similar to FIG. 4 is activated. The operator can then choose to view all the saved screens by selecting the appropriate object, 50, or the operator may choose to view the saved screens during a specific time period. To do this, the operator simply enters the range of dates and hours in areas 55 and 60. The procedure would be the same in 24 hours mode except the time is entered in by selecting hours from 1 to 24 as opposed to selecting the hour and choosing am or pm in am/pm mode. When the operator makes his viewing selection, the first saved screen appears in a window with a date/time stamp appearing in the upper right hand corner. A sample interface for such a screen is shown in FIG. 6. The operator then has the option to go forward to the next captured image 70, return to the previous image 75, or delete the captured image 80.

The operator can then view the next captured image by selecting object 70, marked 'Next'. By viewing each consecutive image with the time/date stamp marked on it, the operator has a graphic time line of a user's activity on the computer. Assuming the program had been configured to operate continuously, any hourly time periods without any saved images would indicate a period of computer inactivity. Therefore, the operator has not only a historical profile of a user's activity, but can also gain information as to a user's periods of inactivity. A variation is included herein where an operator may not find it necessary to save actual images of a user's session, but may instead elect to save statistical information on a user's activities. This capturing of statistical information would be configured in a manner similar to that just described, only statistics such as download sites, times, dates, file names, sizes, applications running at specific times, and any number of other useful statistics lending information as to a particular user's computer activity would be entered in the log instead of an actual image of the screen capture.

A variation on this embodiment would allow the operator to specify time periods of continuous monitoring. In this manner, the operator may specify periods when no monitoring is desired or stop the monitoring program from running until reactuated by the operator. In a business office, this would be convenient for off hours. A similar example for the home may be when a child is in school. By making adjustments in the configuration options of the invention, this would allow an operator to avoid unnecessary monitoring, thereby expediting future review of captured data and avoiding monitoring of incidental usage.

In a second embodiment of the present invention, the operator may elect to have the times of screen capture execution automatically selected as opposed to manually entering the times. The operator is allowed this option by selecting 10, 'Total,' and 16, 'Random Savings,' from the configuration interface shown in FIG. 2. In implementing this option, the software monitoring utility changes the time of the first through fifth screen captures each hour. This provides an added protection against a user who is capable of determining the intervals at which the screen capture is implemented. Although it is unlikely, it is possible a user could discover the occurrence of the monitoring event by tangible signals generated by the computer, such as a hard disk activity light. By using option 16 of FIG. 2, the operator allows the times at which the screen captures are executed to vary by the hour, thus prohibiting the user from determining the particular minute or other time measure at which the capture will occur. The operator may then later retrieve captured images or statistics in a manner that is consistent with that described in the first embodiment. In a further modification, the program of the present invention allows the operator to specify periods when no monitoring is to be implemented.

In a third embodiment of the invention, a monitoring scheme more directed at determining a user's online activity is allowed. In this embodiment, the monitoring is not initiated until a modem download is detected. The operator may configure it to monitor at the discrete moments selected by the operator similar to the method described in embodiment 1. To do this, the operator would choose 18, 'Modem', and 20 'Manual Setup', from the interface depicted in FIG. 2. Doing so would activate the configuration screen shown in FIG. 5.

Figure 5:
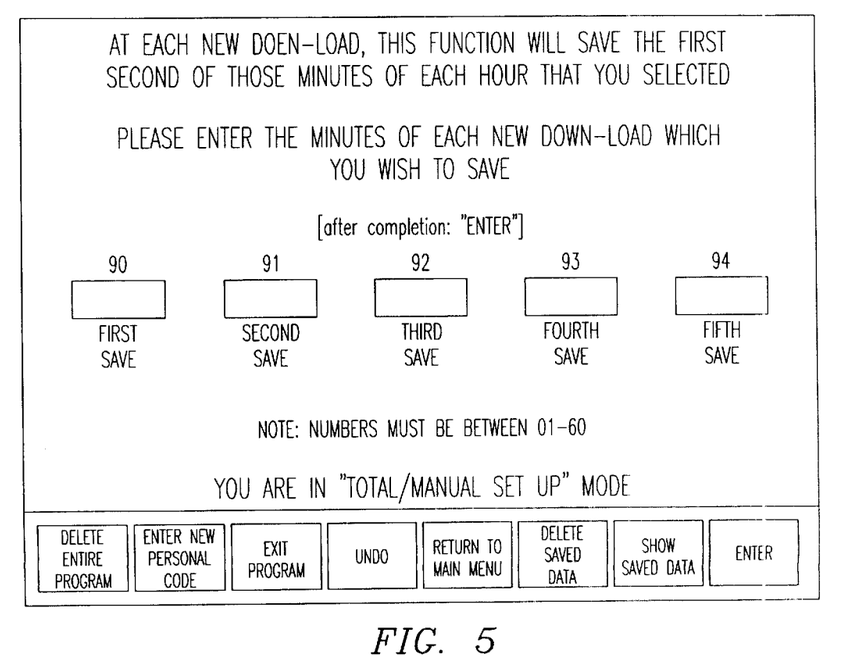
FIG. 5 is a configuration interface activated when the operator chooses to manually select the screen capture times and also chooses to have screen captures activated by modem downloads only.

At this modem-download interface, times are entered by the operator in the appropriate areas 90, 91, 92, 93, and 94. One difference in the functionality of this configuration compared to the configuration described in the first embodiment is that in this configuration, screen captures are not executed until a modem download occurs. When a modem download occurs, the entries made by the operator in the interface depicted in FIG. 4 are compared to the system clock and a capture is executed when a minute on the system clock is consistent with a minute entered by the operator at this interface.

It should be understood that in operating the invention according to this embodiment, a user's session in which no online activity occurs will not be subject to monitoring. Accordingly, an operator would only use this configuration when interested solely in monitoring a user's online activity. The operator may then later retrieve captured images or statistics in a manner that is consistent with that described in the first embodiment. With additional modification, the invention allows the operator to specify periods when no monitoring is to be implemented.

In a fourth embodiment of the present invention, the operator has another configuration available that may be directed to monitoring online activity. The operator may choose this configuration by respectively selecting 18 and 16 from the interface depicted in FIG. 2. The functionality of this configuration is similar to that described in the second embodiment with the exception that screen captures are not executed until the detection of a modem download. For each modem download, screen captures will be executed at the first second of five randomly selected minutes over an hour interval, the pattern repeating for each hour designated. The operator may then later retrieve captured images or statistics in a manner that is consistent with that described in the first embodiment. With some modification, the invention allows the operator to specify periods when no monitoring is to be implemented.

In addition to password usage, a further degree of operational integrity may be implemented to increase the difficulty of a user deleting the saved images in the case the user is able to discover the operation of the disclosed invention. This may be done by introducing a series of keywords or numerical entries that must be correctly entered in order to confirm the deletion. Ideally, only the operator would be knowledgeable of such information, and thus, even if the user discovers the operation of the invention, the possibility of the user being capable of deleting the saved data or disabling the program is further minimized.

Instead of a series of password requests, the program could instead require multiple request screens to cancel or delete the monitoring program or the stored data. Preferably, the number of distinct requests and requisite responses (clicks) handles the situation where the operator has forgotten the password and needs to cancel the program, e.g., before the harddrive falls. Although the user could in principle then delete the downloaded data (and even the monitoring program itself), the user would be unable to say the deletions were accidental if a large number, e.g., 21, of discrete steps were necessary to accomplish deletion.

It should be understood that the series of screen downloads/statistical data, stored on the storage devices 11 and 13 or upon the harddrives of the various computers depicted in FIG. 1, may be displayed as they appeared on the user's screen, e.g., display terminal 5A of computer 5, at the time of downloading, e.g., an image 5B thereon, or multiple such downloads displayed. In particular, the operator may select the manner of display and illustrate the user's usage of the computer by displaying multiple images/data alongside each other, e.g., an entire hour's worth of activity may be displayed on the terminal 5A, each image being reduced in size and resolution to fit. The images may be aligned or overlaid to better show computer usage over longer periods of time.

It should also be understood that the intercepted screen downloads/statistical data or other data transmissions may be stored on the aforementioned storage devices 11 and 13, harddrives, zip drives or any other type of memory storage.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for monitoring usage activities of a user on a computer system, said usage activities of said user including the viewing of a plurality of screen images on a display connected to said computer system, said method comprising the steps of:

intercepting a data transmission over a span of time within said computer system, said data transmission corresponding to at least some of said screen images being viewed by said user at a given time within said span of time on said display, said screen images each being a snapshot short in time length compared to said span of time, said snapshots being illustrative of the usage activities of said user of said computer system within said span of time, said data transmission being a portion of data available to said user of said computer system, said data available to said user not being subject to blocking;

storing, within a memory, said snapshots; and viewing, by another user after said step of storing, said snapshots on a display device connected to said computer system, whereby said another user monitors the usage activities of said user on said computer system.

2. The method according to claim 1, further comprising, prior to said step of intercepting, the step of:

defining a multiplicity of discrete times at which said snapshots of said data transmission occur.

3. The method according to claim 2, wherein said step of defining is performed by an operator of said computer system.

4. The method according to claim 2, wherein, in said step of defining a multiplicity of discrete times for intercepting a respective multiplicity of data transmissions, the respective data transmissions correspond to the respective images being displayed on said display at said discrete times.

5. The method according to claim 4, wherein said multiplicity of discrete times correspond to discrete positions within a given time interval.

6. The method according to claim 5, wherein said given time interval is an hour.

7. The method according to claim 4, wherein, in said step of defining, said multiplicity of discrete times are randomly defined, said interceptions of the data transmissions over a given time interval being randomly spaced apart.

8. The method according to claim 7, wherein said interceptions of the data transmissions over a second time interval are also randomly spaced apart.

9. The method according to claim 1, further comprising, prior to said steps of intercepting and storing, the step of:

detecting a download data transmission to said computer system, said download data transmission detection triggering said step of intercepting.

10. The method according to claim 9, wherein said download data transmission is via a modem.

11. The method according to claim 1, wherein said step of storing further comprises the step of appending time and date information of said intercepted data transmission.

12. The method according to claim 11, wherein statistical information on said intercepted data transmission is viewed during said viewing step.

13. The method according to claim 1, wherein a multiplicity of data transmissions are intercepted and stored, a plurality of said transmissions being subsequently simultaneously viewed by said another user on said display device.

14. The method according to claim 13, wherein at least two of said data transmissions are viewed by said another user on said display device.

15. The method according to claim 14, wherein said at least two data transmissions correspond to respective images of the usage activities of said user on said computer system on at least two times.

16. The method according to claim 1, wherein, in said step of viewing, an operator selectively views a multiplicity of intercepted data transmissions stored within said memory.

17. The method according to claim 1, wherein, in said step of intercepting, said computer system intercepts a data transmission within a remote computer system, said intercepted data transmission being stored within said memory in said computer system.

18. The method according to claim 17, wherein said computer system is a server.

19. The method according to claim 1, further comprising, prior to said step of intercepting, the step of:

selectively activating said monitoring of usage activities, said intercepting and storing steps being deactivated by an operator for a given time interval.

20. A monitor for monitoring usage activities of a user on a computer system, said usage activities of said user including the viewing of a plurality of screen images on a display connected to said computer system, said monitor comprising:

interception means for intercepting a data transmission over a span of time within said computer system, said data transmission corresponding to at least some of said screen images being viewed by said user at a given time on said display, said screen images each being a snapshot short in time length compared to said span of time, said snapshots being illustrative of the usage activities of said user of said computer system at said given time, said data transmission being a portion of data available to said user of said computer system, said data available to said user not being subject to blocking;

a memory, connected to said interception means, for storing said snapshots; and     viewing means, connected to said memory, for viewing by another user said snapshots on a display device connected to said computer system, whereby said another user monitors the usage activities of said user on said computer system.

21. The monitor according to claim 20, further comprising:

time defining means for defining a multiplicity of discrete times at which said interception means intercepts said data transmission.

22. The monitor according to claim 21, wherein said multiplicity of discrete times are defined by said time defining means, and the respective data transmissions correspond to the respective images being displayed on said display at said discrete times.

23. The monitor according to claim 22, wherein said multiplicity of discrete times correspond to discrete positions within a given time interval.

24. The monitor according to claim 23, wherein said given time interval is an hour.

25. The monitor according to claim 22, wherein said multiplicity of discrete times are randomly defined, said interceptions by said interception means being randomly spaced apart over a given time interval.

26. The monitor according to claim 20, wherein said interception means intercepts said data transmission after detecting a download data transmission.

27. The monitor according to claim 26, wherein said download data transmission is via a modem.

28. The monitor according to claim 20, wherein said viewing means displays statistical information on said intercepted data transmission.

29. The monitor according to claim 28, wherein said statistical information is selected from the group consisting of download sites, times, dates, file names, file sizes, and applications running at a particular time.

30. The monitor according to claim 20, wherein said interception means intercepts a multiplicity of data transmissions and said memory stores said multiplicity of data transmissions, said viewing means subsequently and simultaneously displaying for said another user a plurality of said data transmissions on said display device.

31. The monitor according to claim 30, wherein at least two of said data transmissions are viewed on said display device.

32. The monitor according to claim 20, further comprising:

a remote computer system, connected to said computer system, said interception means intercepting a data transmission within said remote computer system, said intercepted data transmission being stored within said memory in said computer system.

33. The monitor according to claim 32, wherein said computer system is a server.

34. The monitor according to claim 20, further comprising:

deletion means, within said computer system, for deleting at least one of said snapshots stored in said memory, said deleting means having a multiplicity of informational requests prior to deletion.

35. A program storage device readable by a machine and encoding a program of instructions for executing the following method steps:

intercepting a data transmission over a span of time within said computer system, said data transmission corresponding to at least some of said screen images being viewed by said user at a given time within said span of time on said display, said screen images each being a snapshot short in time length compared to said span of time, said snapshots being illustrative of the usage activities of said user of said computer system within said span of time, said data transmission being a portion of data available to said user of said computer system, said data available to said user not being subject to blocking;

storing, within a memory, said snapshots; and viewing, by another user after said step of storing, said snapshots on a display device connected to said computer system, whereby said another user monitors the usage activities of said user on said computer system.

36. An article of manufacture comprising a computer usable medium having computer readable program code means embodied thereon for monitoring usage activities of a user on a computer system, said usage activities of said user including the viewing of a plurality of screen images on a display connected to said computer system, the computer readable program code means in said article of manufacture comprising:

(a) computer readable program code for intercepting a data transmission over a span of time within said computer system, said data transmission corresponding to at least some of said screen images being viewed by said user at a given time within said span of time on said display, said screen images each being a snapshot short in time length compared to said span of time, said snapshots being illustrative of the usage activities of said user of said computer system within said span of time, said data transmission being a portion of data available to said user of said computer system, said data available to said user not being subject to blocking;

(b) computer readable program code for storing, within a memory, said snapshots; and     (c) computer readable program code for viewing by another user said snapshots on a display device connected to said computer system, whereby said another user monitors the usage activities of said user on said computer system.

37. A method for monitoring usage activities of a user of a computer system, said usage activities of said user including the viewing a plurality of screen images on said computer system, said method comprising the steps of:

saving over a span of time, to a computer memory within said computer system, at least some of said plurality of screen images being viewed by said user, said saved screen images being snapshots short in time length compared to said span of time, said snapshots being illustrative of the usage activities of said user of said computer system within said span of time, said plurality of screen images being a portion of data available to said user of said computer system, wherein said data available to said user is not subject to blocking; and viewing, by another user after said step of saving, said at least some of said saved screen image, whereby said another user may monitor the usage activities of said user on said computer system.

38. A computer system for monitoring usage activities of a user of said computer system, said user viewing a plurality of screen images on said computer system, said computer system comprising:

a computer memory;

screen image saving means for saving over a span of time, to said computer memory, at least some of said plurality of screen images being viewed within said span of time by said user, said saved screen images being snapshots short in time length compared to said span of time, said snapshots being illustrative of the usage activities of said user within said span of time said plurality of screen images being a portion of data available to said user of said computer system, wherein said data available to said user is not subject to blocking; and a view screen for viewing said snapshots by another user after said screen image saving means saves at least some of said saved snapshots, whereby said another user may monitor the usage activities of said user on said computer system.

* * * * *

UNITED STATES PATENT AND TRADEMARK OFFICE
CERTIFICATE OF CORRECTION

PATENT NO. : 6,446,119 B1  
DATED : September 3, 2002  
INVENTOR(S) : Laslo Olah et al.

It is certified that error appears in the above-identified patent and that said Letters Patent is hereby corrected as shown below:

Column 1,
Line 41, replace "net" with -- .net --

Column 5,
Line 19, replace "skill ed" with -- skill-ed --

Column 7,
Line 27, replace "comer" with -- corner --

Signed and Sealed this

Twenty-fifth Day of February, 2003

JAMES E. ROGAN
*Director of the United States Patent and Trademark Office*